(No Model.)
W. J. MOORE.
WIRE BASKET.
No. 286,952.                Patented Oct. 16, 1883.
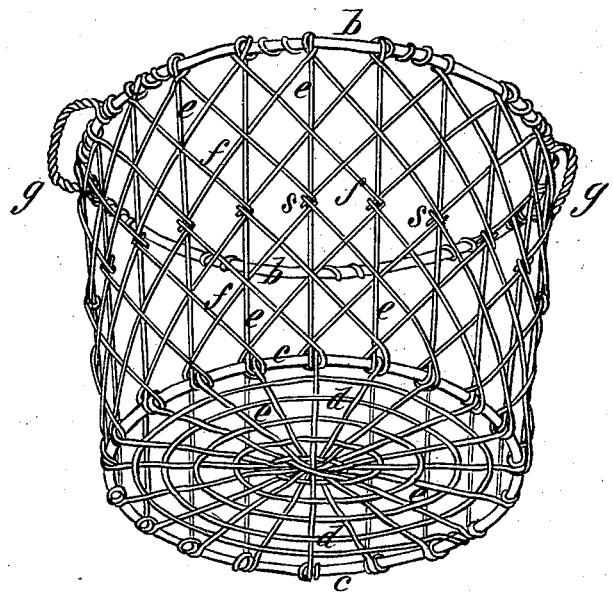
WITNESSES:
Donn Twitchell
C. Sedgwick
INVENTOR:
W. J. Moore
BY Munn & Co
ATTORNEYS.

UNITED STATES PATENT OFFICE.

WILLIAM J. MOORE, OF WEATHERFORD, TEXAS.

WIRE BASKET.

SPECIFICATION forming part of Letters Patent No. 286,952, dated October 16, 1883.

Application filed September 4, 1883. (No model.)

*To all whom it may concern:*

Be it known that I, WILLIAM J. MOORE, of Weatherford, in the county of Parker and State of Texas, have invented certain new and useful Improvements in Wire Baskets, of which the following is a full, clear, and exact description.

This invention has for its object the production of a light, durable, and strong basket, made of wire, and more especially designed for handling cotton and farm produce, including potatoes and fruit.

The invention consists in a certain combination, arrangement, and connection of a series of wires, whereby great strength is attained, the same including upper and lower hoop wires, upright or straight wires arranged to connect said hoops and wire frame bottom, and reversely-arranged diagonal wires or braces also connecting the top and bottom hoops, and twisted or wrapped around the upright wires intermediately of their length, substantially as hereinafter described.

Reference is to be had to the accompanying drawing, forming a part of this specification, in which the figure represents a view in perspective of a wire basket embodying my invention.

The basket is made of circular form and of any desired size, with its top somewhat wider than its bottom, to facilitate emptying it of its contents. Stout wire hoops $b$ $c$ are arranged around its upper and lower ends, and its bottom frame is composed in part of the wire ring or hoop $c$, in part of a spirally-arranged lighter wire $d$, and in part of crossing straight wires $e$, arranged at suitable distances apart all around the basket. These wires $e$ are bent upward to form the sides of the basket, and are twisted or wrapped around the top hoop, $b$, and bottom hoop, $c$, and extended or interlaced with the spiral wire $d$ of the bottom frame of the basket, which frame said wires $e$ cross, the same passing down one side of the basket and up the other, thus making a firm connection of the bottom and sides, the lower hoop, $c$, forming the main support for the bottom. The basket is further strengthened and its sides inclosed by an open net-work of reverse diagonally-arranged or crossing wires, $f$, twisted or wrapped around the upper and lower hoops, $b$ $c$, also around the wires $e$, intermediately of the depth of the basket, as at $s$. These braces may be thus woven to connect the top and bottom hoops and the uprights either from a single piece of wire or from several pieces.

Wire of any suitable kind and size may be used in the construction of the basket, which is provided on opposite sides with handles $g$ $g$.

Having thus fully described my invention, I claim as new and desire to secure by Letters Patent—

In an interlacing-wire basket, the combination of the top and bottom hoops, $b$ $c$, the spiral wire bottom $d$, the wires $e$, arranged to cross and interlace with said bottom and twisted or wrapped around the hoops $b$ $c$, and the reverse diagonal braces $f$, twisted or wrapped around the lower and upper hoops and around the uprights at the side of the basket intermediately of the depth thereof, substantially as shown and described.

WILLIAM J. MOORE.

Witnesses:
FRANK S. KERR,
W. H. HANNON.